United States Patent
Patel et al.

(10) Patent No.: US 12,351,223 B2
(45) Date of Patent: Jul. 8, 2025

(54) RAILROAD CROSSING WARNING SYSTEM FOR ENHANCED ROUTE PLANNING

(71) Applicant: Meet Patel, Happy Valley, OR (US)

(72) Inventors: Meet Patel, Happy Valley, OR (US); Nathan Matos De Almeida, Ceara (BR)

( * ) Notice: Subject to any disclaimer, the term of this patent is extended or adjusted under 35 U.S.C. 154(b) by 612 days.

(21) Appl. No.: 17/403,511

(22) Filed: Aug. 16, 2021

(65) Prior Publication Data
US 2023/0050879 A1  Feb. 16, 2023

Related U.S. Application Data

(60) Provisional application No. 63/066,608, filed on Aug. 17, 2020.

(51) Int. Cl.
| | | |
|---|---|---|
| B61L 29/28 | (2006.01) | |
| B61L 25/02 | (2006.01) | |
| H04R 1/22 | (2006.01) | |
| H04W 4/06 | (2009.01) | |

(52) U.S. Cl.
CPC ............ B61L 29/28 (2013.01); B61L 25/02 (2013.01); H04R 1/222 (2013.01); H04W 4/06 (2013.01)

(58) Field of Classification Search
CPC ......... B61L 29/28; B61L 25/02; H04R 1/222; H04W 4/06
See application file for complete search history.

(56) References Cited

U.S. PATENT DOCUMENTS

2019/0212156 A1* 7/2019 Ghannam .............. G08G 1/133

FOREIGN PATENT DOCUMENTS

JP  2020104667 A * 7/2020 .............. B61L 25/06

* cited by examiner

*Primary Examiner* — Robert J McCarry, Jr.
(74) *Attorney, Agent, or Firm* — COCHRAN LEGAL, LLC; Colin Cochran, Esq.

(57) ABSTRACT

In an embodiment, a system for detection of trains at railroad crossings is provided. The system comprises a field-deployed detection and reporting device comprising a microphone, a communication module, a microprocessor, and an application. When executed on the microprocessor, the application receives data describing sounds captured by the microphone and identifies frequencies of a first received sound. The application also transmits, based on the identified frequencies and a formula, a first message via the communication module. The first received sound is generated by a warning bell sounded at the railroad crossing. The first message is received by a backend server that issues a first broadcast based on receipt of the first message. The application further determines that the first received sound discontinues. Based on the determination, the application sends a second message via the module to the backend server which issues a second broadcast that the crossing is reopened.

20 Claims, 3 Drawing Sheets

RAILROAD CROSSING WARNING SYSTEM FOR ENHANCED ROUTE PLANNING

CROSS REFERENCE TO RELATED APPLICATIONS

The present non-provisional patent application is related to U.S. Provisional Patent Application 63/066,608 filed Aug. 17, 2020, the contents of which are incorporated herein in their entirety.

FIELD OF THE INVENTION

The present disclosure is in the field of railroad transportation. More particularly, the present disclosure provides systems and methods of detecting sounds associated with warning bells at railroad crossings that indicate passing trains and based thereon advising nearby motorists via wireless notification of potential for traffic congestion and delay.

BACKGROUND

Railroad transportation, for moving both passengers and freight, are essential to the economic and social well-being of developed countries. Freight trains transport a major portion of US goods daily. This has inadvertently led to problems with blocked railroad crossings, for extensive periods of time in many cases. Railroads used by the freight industry often travel through urban areas and cause extensive automobile traffic delays due to their length and slower speeds. Freight trains could stretch up to three miles and are operated at very low speeds through residential areas. The issues of railroad crossing safety and traffic congestion have reached high levels of the US federal government but have failed to receive action. Further, there have been documented cases of delayed emergency responses.

Although advanced route planning technology is available, such technology does not provide information relating to the state of railroad crossings. This information is not shared by railroad operators. Rail companies have state-of-the-art monitoring systems that are not available for public or city municipality use.

Previous implementations describe devices using laser or vibration to detect incoming trains and may require cooperation of the railroad involved including using components owned by the rail company. No previous implementation independently identifies the state of a crossing involving motor vehicle traffic.

Most railroad crossings now have protection in the form of automatic warning devices such as flashing lights, warning sounds, and barriers or gates. Crossing gates and electronic bells are activated simultaneously before the arrival of the train and stay active for several minutes after the train has passed. But the problem of automobile traffic congestion caused by long and slow freight trains remains.

DETAILED DESCRIPTION

Figure 1:
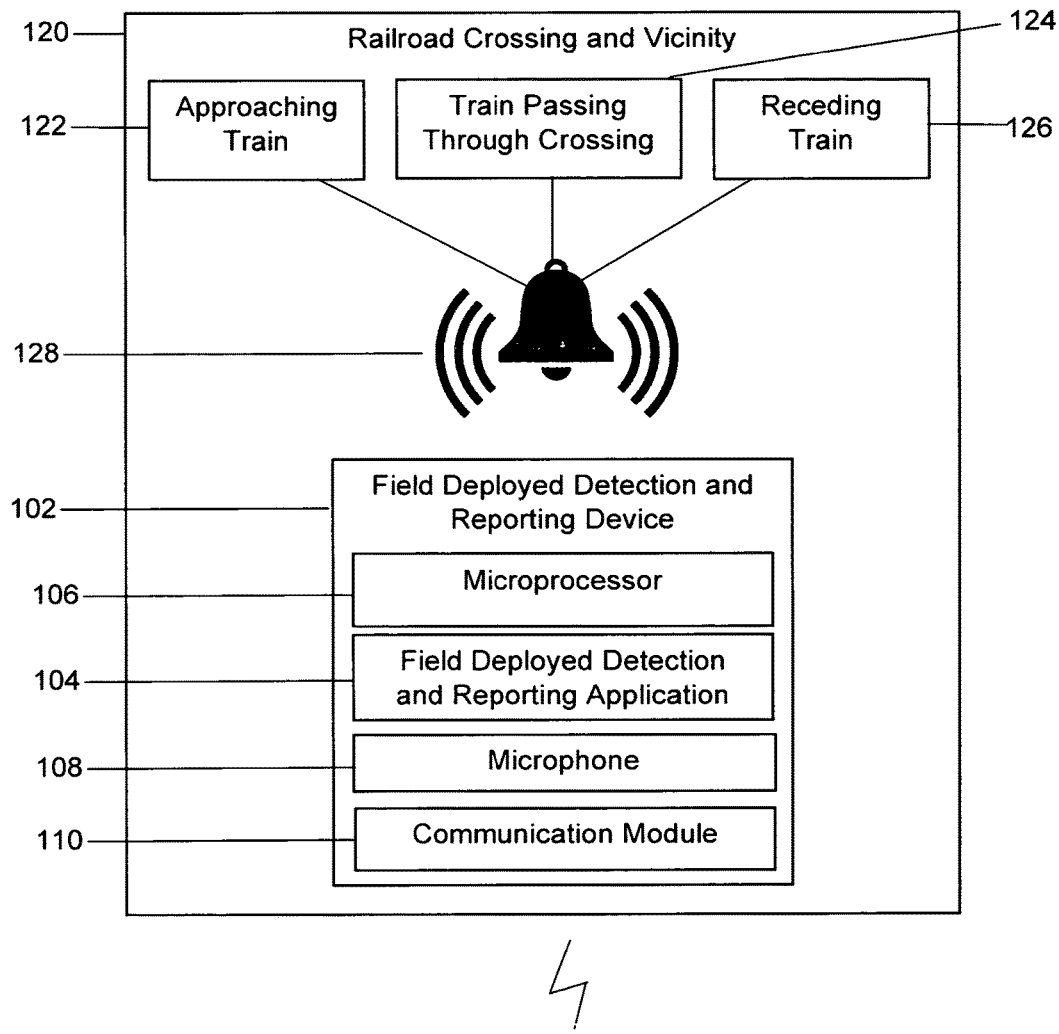
FIG. 1 is a block diagram of a railroad crossing warning system for enhanced route planning according to an embodiment of the present disclosure.
Figure 1:
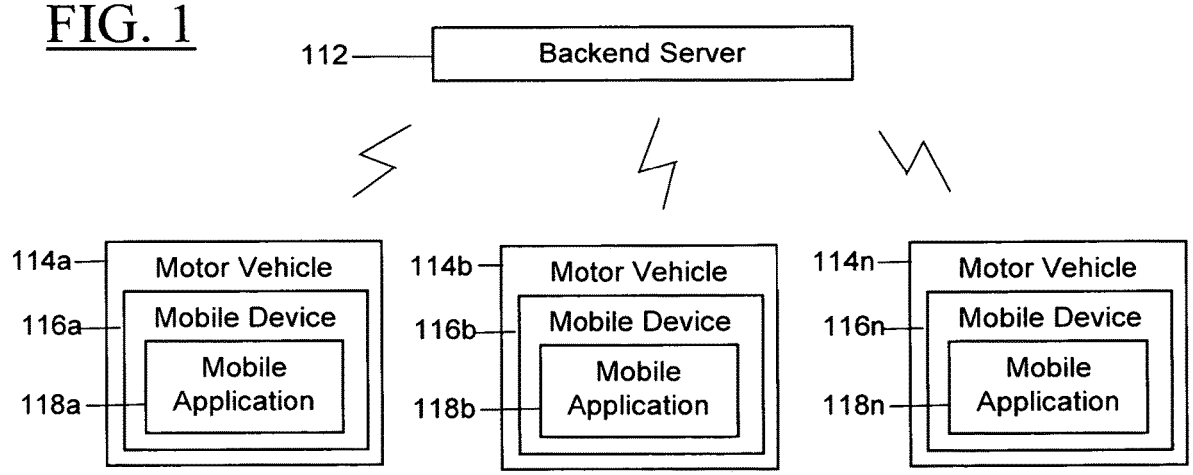

Systems and methods described herein provide for observing the open or closed state of a railroad crossing and making that information available to motor vehicle operators and others in near real time via a mobile application. Ambient sound is captured, converted into frequencies, unwanted frequencies are removed using digital filter, and the frequencies in the band of interest are closely monitored. Electronic bells that are typically mounted on masts supporting gates or tall poles near crossings are activated by the railroad as a train is approaching. Systems provided herein are programmed to detect when the electronic bell begins and stops sounding.

Systems and methods of the present disclosure have two primary objectives: 1) Quickly and accurately determine the state of railroad crossing gate, either open or closed; and 2) Communicate with the mobile application in proximate vehicles as quickly as possible.

As a train approaches a crossing, the crossing gate closes and the bell begins to sound. Electronic bells used by railroads have an array of frequencies. However, three dominant frequencies were found in almost all cases during field tests. These frequencies are fed into a formula or algorithm to determine the state of the gate. A device that may be referred to as the Field-Device (FD) is deployed in the vicinity of a crossing and listens continuously using a digital microphone. The surrounding noise is captured and processed by a microprocessor that may be dual core and an application executing thereon. When the bell begins alarming such that a train is approaching, an algorithm or formula mentioned previously is activated by the application. The algorithm or formula detects the specific bell frequencies and orders a communication module to update status of the crossing to "closed" in a mobile application executing on motorist devices. The same algorithm also detects when the bell has stopped alarming to indicating reopening of the crossing. The microprocessor then orders the communication module to send updates to motorists' devices changing the crossing status to "open".

The application, including at the least one algorithm, periodically samples ambient sound, for example every 10 milliseconds using the I2S protocol, performs Fast Fourier Transform (FFT) to convert sound into frequency, and applies the formula included in the application to determine whether the bell is ringing. This formula was developed based on real data gathered by conducting numerous field experiments. Once the state of the gate is determined, the microprocessor provides this information to the communication module. The communication module is in constant contact with a backend server that sends messages to instances of the mobile application executing on motorists' mobile devices and on other devices. Collectively, the entire process is completed in near real-time.

The device provided herein is equipped with a solar panel that powers all components of an Integrated Circuit (IC) when optimal sunlight is available. The solar panel also charges the onboard Lithium-ion battery during the optimal sunlight hours. The Li-ion battery provides power when the solar panel cannot provide power. The device is energy independent. Power needs of systems provided herein may be met by the structure described above and may reduce or eliminate a need for maintenance.

The lightweight design and small footprint of the device allows it to be mounted conveniently in the vicinity of railroad crossing. The device is not in most embodiments mounted on any of the active components of the railroad system owned by the railroad company.

Systems and methods provided herein do not control or take input from any railroad crossing components or other components controlled by the railroad. Further, no action or participation by the railroad is required or involved. The device provided herein which contains the microprocessor, microphone, and cellular module may be mounted, for example, on a street sign, on a sign board, or on a residential awning in the vicinity of the railroad crossing. The detection and warning methods provided herein are fully independent of the railroad.

The field deployed detection and reporting device contains the microphone, for example an Adafruit I2S MEMS Electric Mic Amplifier (Product ID 3421). The device also contains the microprocessor, for example a esp32-wroom-32E, and the communication module, for example a Quectel BG95.

The device may share data with local public transportation authorities. Buses equipped with GPS functionality may use functionality provided to reduce delays and improve rider experience. First responders' response time may be greatly improved by having this information in advance.

In an embodiment, a network of interconnected field devices such as that provided herein may be built. Existing backend server functionalities to determine crossing status when one of the devices in the chain malfunctions may be used. The data gathered by such device network can also be used to train a Neural Network which, when used in conjunction with the Artificial Intelligence (AI), will open numerous possibilities to either directly improve the system described here or provide add-on services in the future.

As part of getting information from the point-of-action to the end user, a mobile application was developed. With its user-friendly interface, it shows the state of the gate with color coded rings. These rings are superimposed onto the map of the area of focus. The overall system is designed to expand the capability nationwide.

Turning to the figures, FIG. 1 is a diagram of a system of gate tracking as provided herein. FIG. 1 illustrates components and interactions of a system 100 of railroad crossing warning for enhanced route planning.

The system 100 comprises a field deployed detection and reporting device 102 and a field deployed detection and reporting application 104 executing thereon, referred to hereafter for brevity as the device 102 and the application 104, respectively. The application 104 includes at least one algorithm that is not shown in FIG. 1.

The system 100 also includes a microprocessor 106, a microphone 108, and a communication module 110 which in some embodiments may be referred to as a cellular module. The system 100 further includes a backend server 112, motor vehicles 114a-n, mobile devices 116a-n, and mobile applications 118a-n. The mobile applications 118a-n execute on the mobile devices 116a-n which are carried in motor vehicles 114a-n that may travel near railroad crossings and be subject to delays by passing trains.

Also illustrated for discussion purposes in FIG. 1 but not directly provided by the system 100 are a railroad crossing and vicinity 120 which may be referred to for brevity as the crossing 120, an approaching train 122, a train passing through crossing 124, a receding train 126, and a warning bell 128, all components provided by a railroad company in most embodiments.

As approaching trains 122, trains passing through crossing 124, and receding trains 126, i.e., trains leaving the crossing 120, are in effect at a crossing 120, the warning bell 128 is sounded by the railroad company to warn motorists. A barrier may also be lowered to physically obstruct vehicles from crossing tracks. The microphone 108 is receiving and passing along sounds of the warning bell 128 and all other proximate sounds to the microprocessor 106. The application 104, via at least one algorithm, measures frequencies of sounds received and detects the frequencies of the sound projected by the warning bell 128. As described in greater detail above, as long as the measured frequencies meets criteria contained in the application 104, the device 102, via the cellular module 110, notifies the backend server 112 which transmits messages to the mobile applications 118a-n. Motorists and others who have downloaded the mobile application 118a-n on their phones have this information readily available when the application is launched. Availability of information provided by the mobile application 118a-n is not dependent on users' geographic location. Components in FIG. 2 and FIG. 3 are indexed to components provided by the system 100.

Figure 2:
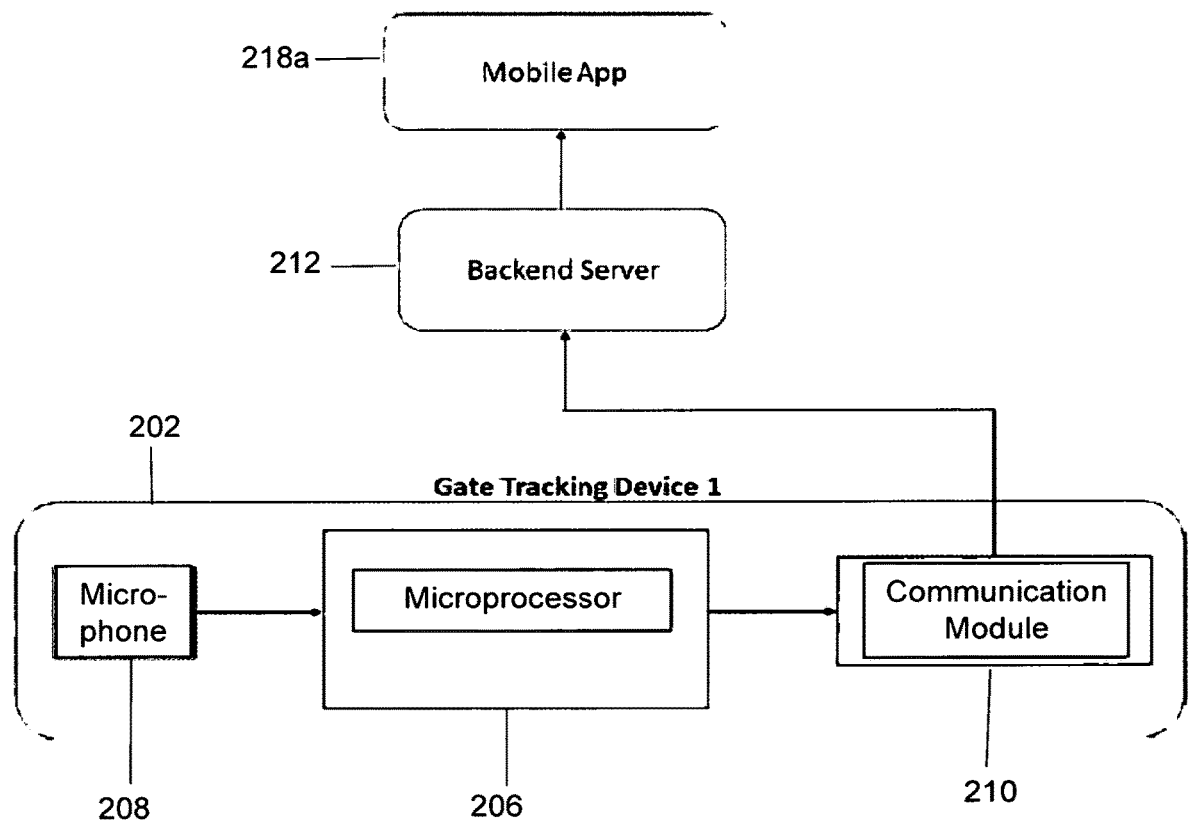
FIG. 2 is a flow diagram of a railroad crossing warning system for enhanced route planning according to an embodiment of the present disclosure.

FIG. 2 shows communication between the device 202 and backend server 212 supporting the mobile application 214. In an embodiment, the microphone 208 may be a Adafruit I2S digital mic. In an embodiment, the microprocessor 206 may be an esp32-wroom-32E microprocessor. In an embodiment, the communication module 210 may be a Quectel BG95 communication (cellular/gps) module.

Figure 3:
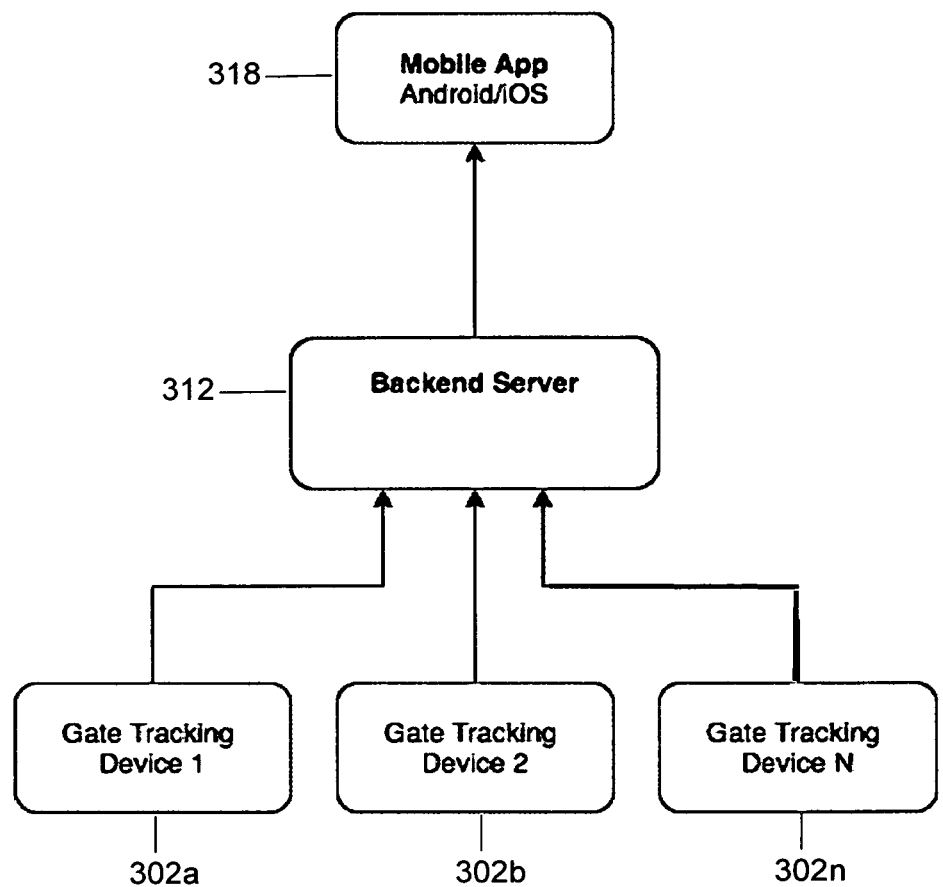
FIG. 3 is a flow diagram of a railroad crossing warning system for enhanced route planning according to an embodiment of the present disclosure.

FIG. 3 illustrates multiple devices 302, shown as Gate Tracking Devices, transmitting through the backend server 312 to mobile applications 318. In embodiments, a single backend server 312 can receive messaging from a plurality of devices 302. If these devices 302 are located at railroad crossings on the same rail line in geographical succession, their reported information may be used in determining if a railroad train has stopped, its direction, or if one of the devices 302 has malfunctioned.

In an embodiment, a system for detection of trains at railroad crossings is provided. The system comprises a field-deployed detection and reporting device comprising a microphone, a communication module, a microprocessor, and an application. When executed on the microprocessor, the application receives data describing sounds captured by the microphone and identifies frequencies of a first received sound. The application also transmits, based on the identified frequencies and a formula, a first message via the communication module. The first received sound is generated by a warning bell sounded at the railroad crossing. The first message is received by a backend server that issues a first broadcast based on receipt of the first message. The application further determines that the first received sound discontinues. Based on the determination, the application sends a second message via the module to the backend server. Based on receipt of the second message, the backend server issues a second broadcast, the second broadcast indicating that the railroad crossing is reopened.

In another embodiment, a system for reducing vehicle traffic delays at railroad crossings is provided. The system comprises a computer and an application executing on the computer that processes a series of sounds received by a microphone proximate the computer, performs Fast Fourier Transform (FFT) analysis on the series of received sounds, determines, based on the analysis, that a first received sound exhibits at least a first frequency, and instructs a server, via a communication module and based on the determination, to transmit a broadcast. The first received sound is generated by an alarm bell at the railroad crossing. Generation of the first received sound by the alarm bell indicates that a railroad train is approaching the crossing. The broadcast is directed to selected wireless devices.

In yet another embodiment, a method of reducing vehicle traffic delays at railroad crossings is provided. The method comprises a computer equipped with a communication module receiving from a proximate microphone a plurality of electronic signals representing sounds captured by the microphone. The method also comprises the computer identifying a first electronic signal as associated with at least a first frequency exhibited by a first sound of the plurality of sounds. The method also comprises the computer, based on the identification, transmitting via the module a first message to a backend server. The method further comprises the backend server issuing a broadcast to wireless devices proximate the computer. The at least first frequency is associated with a warning bell situated at the railroad crossing. The broadcast warns the wireless devices of a closed status of the railroad crossing. The computer subsequently transmits, via the module a second message to the backend server, the second message advising of an open status of the railroad crossing.

What is claimed is:

1. A system for detection of trains at railroad crossings, comprising:
    a field-deployed detection and reporting device comprising:
        a microphone;
        a communication module;
        a microprocessor; and
        an application executing on the microprocessor that:
            receives data describing sounds captured by the microphone,
            identifies frequencies of a first received sound, and
            transmits, based on the identified frequencies and a formula, a first message via the communication module.

2. The system of claim 1, wherein the device is situated in an immobile position proximate a railroad crossing.

3. The system of claim 1, wherein the sounds captured by the microphone include a plurality of frequencies,
    wherein the microprocessor is configured to determine from the plurality of frequencies at least one frequency corresponding to a sound generated by a warning bell sounded at the railroad crossing.

4. The system of claim 1, wherein the first message is received by a backend server that issues a first broadcast based on receipt of the first message.

5. The system of claim 4, wherein the broadcast is directed to wireless devices in a vicinity of the railroad crossing and warns of temporary closing of the railroad crossing.

6. The system of claim 1, wherein the application further determines that the first received sound discontinues.

7. The system of claim 6, wherein based on the determination, the application sends a second message via the module to the backend server.

8. The system of claim 7, wherein based on receipt of the second message, the backend server issues a second broadcast, the second broadcast indicating that the railroad crossing is reopened.

9. A system for reducing vehicle traffic delays at railroad crossings, comprising:
    a computer; and
    an application executing on the computer that:
        processes a series of sounds received by a microphone proximate the computer,
        performs Fast Fourier Transform (FFT) analysis on the series of received sounds,
        determines, based on the analysis, that a first received sound exhibits at least a first frequency, and
        instructs a server, via a cellular module and based on the determination, to transmit a broadcast.

10. The system of claim 9, wherein the computer is situated proximate a railroad crossing.

11. The system of claim 10, wherein the first received sound is generated by an alarm bell at the railroad crossing.

12. The system of claim 11, wherein generation of the first received sound by the alarm bell indicates that a railroad train is approaching the crossing.

13. The system of claim 9, wherein the broadcast is directed to selected wireless devices.

14. A method of reducing vehicle traffic delays at railroad crossings, comprising:
    a computer equipped with a communication module receiving from a proximate microphone a plurality of electronic signals representing sounds captured by the microphone;
    the computer identifying a first electronic signal as associated with at least a first frequency exhibited by a first sound of the plurality of sounds; and
    the computer, based on the identification, transmitting via the module a first message to a backend server.

15. The method of claim 14, further comprising the backend server issuing a broadcast to wireless devices proximate the computer.

16. The method of claim 15, further comprising the broadcast warning the wireless devices of a closed status of the railroad crossing.

17. The method of claim 14, wherein the computer is situated proximate a railroad crossing.

18. The method of claim 14, wherein the at least first frequency is associated with a warning bell situated at the railroad crossing.

19. The method of claim 14, further comprising the computer subsequently transmitting via the module a second message to the backend server, the second message advising of an open status of the railroad crossing.

20. A system for detection of trains at railroad crossings, comprising:
    a field-deployed detection and reporting device comprising:
        a microphone;
        a communication module;
        a microprocessor; and
        an application executing on the microprocessor that:
            receives data describing sounds captured by the microphone,
                wherein the sounds captured by the microphone include a plurality of frequencies,
            filters the plurality of the frequencies of the sounds to isolate different frequencies,
            identifies frequencies corresponding to a railroad crossing warning bell, and
            transmits, based on the identified frequencies and a formula, a first message via the communication module.

* * * * *